INVENTOR.
WILLIAM P. OEHLER

July 7, 1953 — W. P. OEHLER — 2,644,618
FERTILIZER DISTRIBUTOR
Filed April 15, 1948 — 3 Sheets-Sheet 2

INVENTOR.
WILLIAM P. OEHLER
ATTORNEYS

July 7, 1953  W. P. OEHLER  2,644,618
FERTILIZER DISTRIBUTOR
Filed April 15, 1948  3 Sheets-Sheet 3
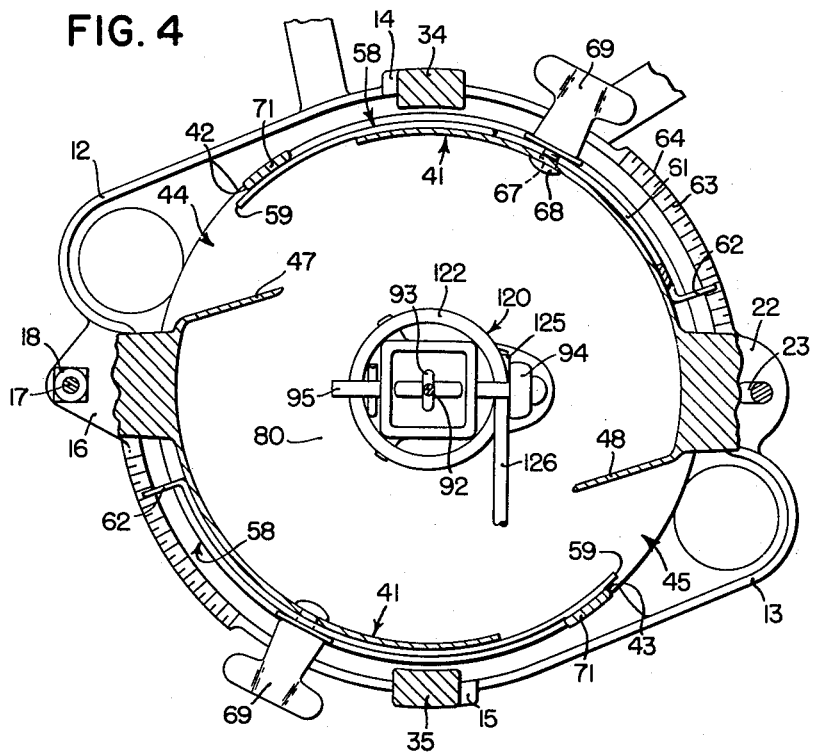
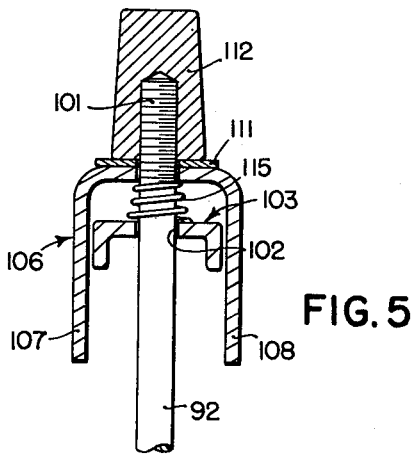
*INVENTOR.*
WILLIAM P. OEHLER
BY
*ATTORNEYS*

Patented July 7, 1953

2,644,618

UNITED STATES PATENT OFFICE 2,644,618

FERTILIZER DISTRIBUTOR

William P. Oehler, Moline, Ill., assignor to Deere & Company, Moline, Ill., a corporation of Illinois Application April 15, 1948, Serial No. 21,287

11 Claims. (Cl. 222—242)

The present invention relates generally to agricultural machines, and particularly to distributing mechanism especially adapted to serve as means for distributing fertilizer during the planting of seed or when side dressing row crops and other uses.

The object and general nature of the present invention is the provision of a new and improved fertilizer hopper and feeding and controlling mechanism for governing the discharge of the material from the hopper. More particularly, it is a feature of this invention to provide a hopper having dual discharge gates and associated mechanism especially useful for such operations as side dressing row crops, and a further feature of this invention is the provision of a new and improved gate particularly adapted for dual outlet hoppers and the like.

Another important feature of the present invention is the provision of fertilizer distributing mechanism in the hopper whic his so constructed and arranged to provide for easy and quick removal of the hopper from its supporting base whereby the operator at the end of the day may readily remove the hopper, turn the same upside down and so remove all fertilizer material from the hopper before leaving the machine for the night or before storing it for some other period of time, whereby the operator may readily remove all the fertilizer material from the hopper distributing mechanism so as to have the latter clean when storing the machine. Any fertilizer materials when left over night or for other periods of time in and about the distributing mechanism tend to harden and interfere with subsequent use of the machine.

These and other objects and advantages of the present invention will be apparent to those skilled in the art after a consideration of the following description of one preferred embodiment of this invention.

In the accompanying drawings, in which the preferred form of the invention has been illustrated:

Figure 4 is a sectional view taken generally along the line 4—4 of Figure 1.

Figure 5 is an enlarged detail of the hopper-carried means for holding the lower feed plate up against the lower edge of the hopper bottom.

Figure 1:
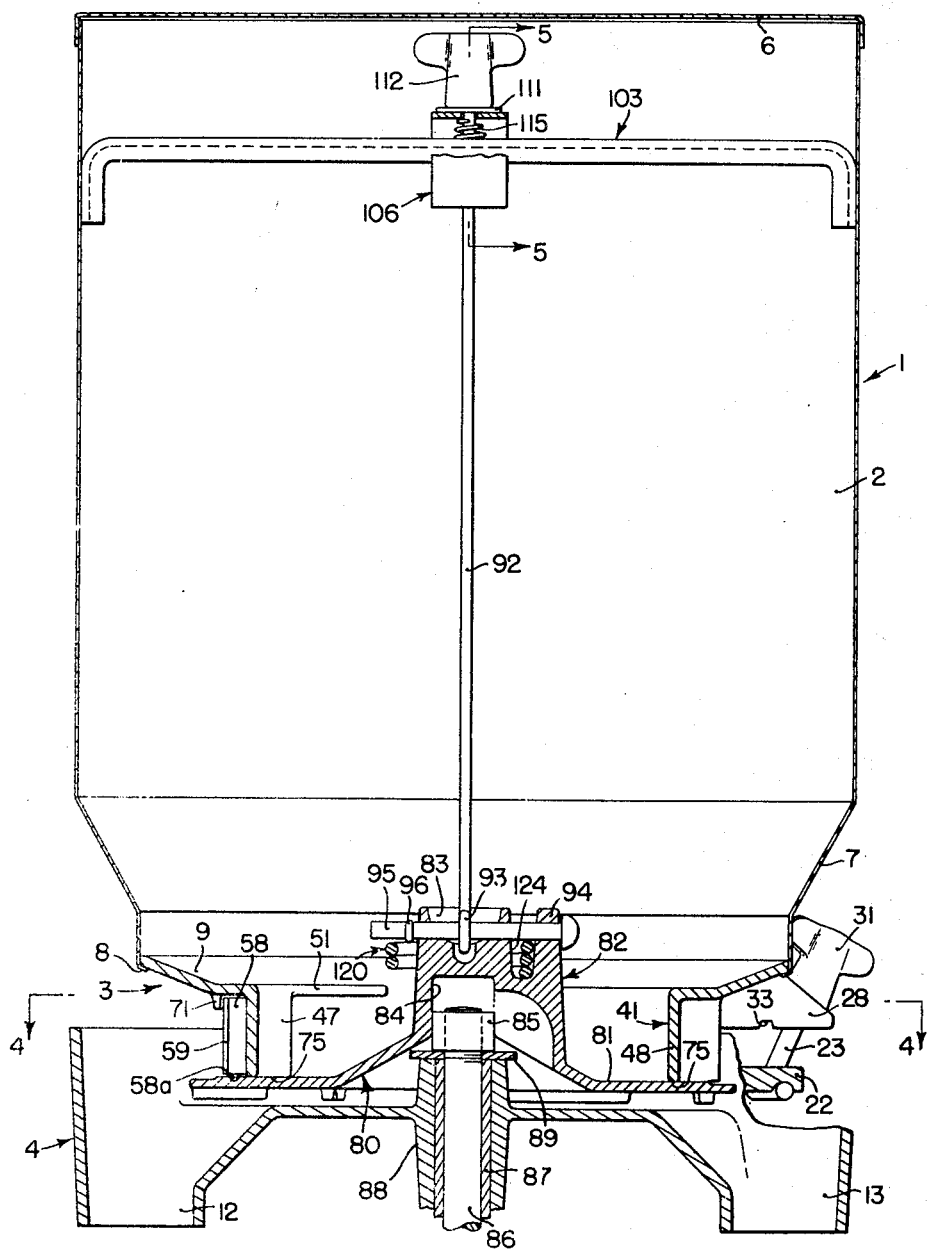
Figure 1 is a vertical transverse section taken through a fertilizer hopper in which the principles of the present invention have been incorporated.

Referring now to the drawings, the fertilizer hopper in which the principles of the present invention have been incorporated is indicated in its entirety by the reference numeral 1 and includes a fertilizer container in the form of a can 2 mounted on a hopper bottom 3, the whole being supported by releasable means on a support or base 4. The upper end of the can 2 is closed by a detachable cover 6 and the lower end is tapered inwardly, as at 7, and is crimped, as shown at 8, about the upper or outer flange 9 which forms a part of the hopper bottom 3.

Figures 2, 3:
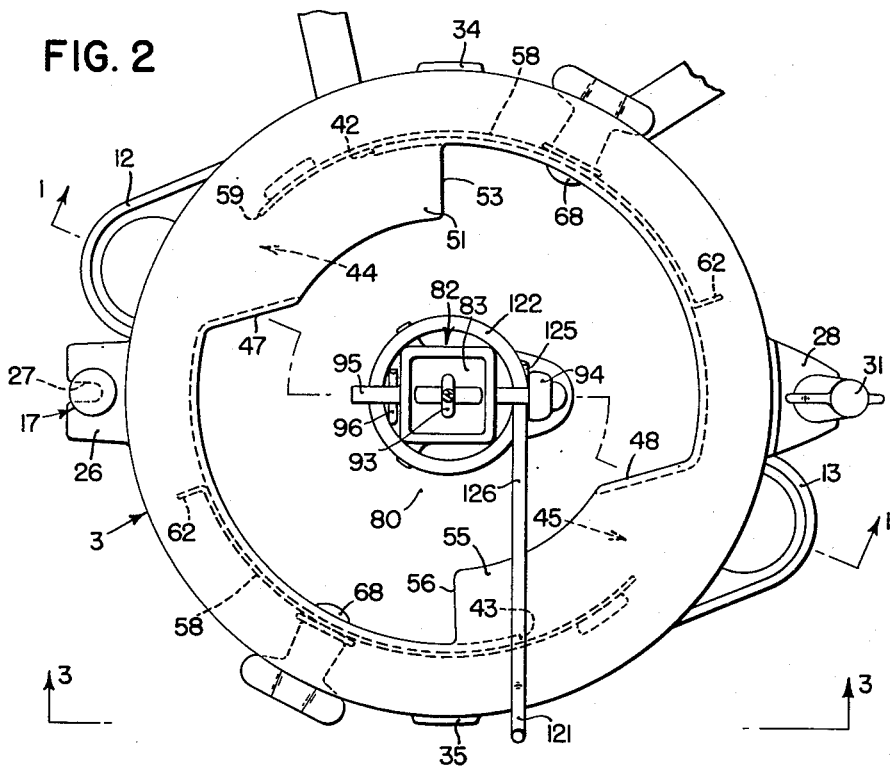
Figure 2 is a top view of the hopper bottom with the can removed.
Figure 3 is a side view of the hopper bottom shown in Figure 2, corresponding generally to a view taken along the line 3—3 of Figure 2.

The base 4 is provided with a pair of generally downwardly directed spouts 12 and 13 arranged generally in diametrically opposite positions, and intermediate the spouts 12 and 13 is a pair of hopper bottom receiving lugs 14 and 15, best shown in Figure 4. Adjacent the spout 12 is a lug 16 which is apertured to receive a bolt 17 arranged with its lower threaded end extending through an aperture in the lug 16. The bolt 17 is held in different positions of adjustment by a pair of lock nuts 18. By loosening one of the lock nuts and tightening the other, the head 19 of the bolt 17 may be disposed at different elevations relative to the base 4. At the side of the latter opposite the lug 16 the base 4 is provided with an apertured lug 22 which rockably receives a swivel bolt 23. The hopper bottom 3 is provided at one side with a bifurcated lug 26 having a notch 27 therein to receive the upper portion of the bolt 17, as best shown in Figure 3, and at the other side the hopper bottom 3 carries a bifurcated lug 28 which is slotted, as at 29, to receive the swivel bolt 23 on which a wing nut 31 is threaded. The base 4 carries a lug 32 which normally seats in a socket 33 formed in the lower portion of the lug 28 on the hopper bottom 3, and the latter member is provided with a pair of opposite lugs 34 and 35 which normally rest on the base lugs 14 and 15 (Figure 4). Utilizing the lock nuts 18 to bring the head 19 of the bolt 17 to the proper position, it will be seen that the hopper bottom 3 may be supported on the base lugs 14 and 15 and the small lug 32 by swinging the swivel bolt 23 up into the slot 29 and tightening the bolt 31, the bolt 17 being adjusted so that the bifurcated lug 26 snugly engages the head 19 of the bolt 17, yet the hopper 1 may readily be detached from the support 4 by loosening the wing nut 31 and swinging the bolt 23 out of the slot 29, after which the hopper may be removed by tilting the same slightly to disengage the socket 33 from the lug 32 and then shifting the hopper to disengage the bifurcated lug 26 from the bolt 17, after which the hopper may be lifted bodily from the base 4.

The bottom 3 of the hopper 1 comprises a lower cylindrical section 41, which is of reduced diameter as compared with the can 2, to which the inner portions of the upper flange 9 of the hopper bottom 3 are connected. Preferably, the hopper bottom 3 is formed as a single casting. The cylindrical section 41 of the hopper bottom 3 is interrupted at diametrically opposite points, as indicated at 42 and 43 in Figure 2, to provide a pair of opposite discharge outlets or openings 44 and 45 (Figure 4), and at one side of each of the openings 44 and 45 the hopper bottom 3 is provided with a diagonally inwardly extending wall section, said sections being indicated respectively by reference numerals 47 and 48. Above the discharge opening 44 is a wall 51 forming a shelf or ledge, one end of which is joined to the diagonally inwardly extending wall section 47 and the other end 53 of which is extended circumferentially beyond the end 42 of the opening 44. The shelf or wall section 51 extends radially inwardly above the opening 44 so as to prevent material from flowing directly downwardly from the can 2 through the opening 44. A similar wall section 55 is formed opposite the wall section 51 and likewise is joined to the diagonal wall 48 at one end and at the other end 56 is extended circumferentially beyond the edge 43 of the opening 45.

For controlling the flow of material through the opening 44, the member 3 is provided with a flow-controlling arcuate gate 58 the end 59 of which is adapted to extend, to a greater or lesser degree, past the edge 42 and thus decrease or increase, respectively, the effective size of the discharge opening 44. The member 58 is slotted, as indicated at 61, and the end opposite the end 59 is provided with a radially outwardly extending tab 62 which forms a finger hold and additionally an index pointer cooperating with indicia 63 formed on a rib 64 extending generally outwardly and downwardly from the associated portion of the base 4, as best shown in Figures 3 and 4. An opening 67 is formed in the cylindrical wall section 41 of the hopper bottom 3 to receive a bolt 68 which extends outwardly through the opening 67 and the slot 61 in the associated gate 58, and a wing nut 69, which for convenience of manufacture may be identical with the wing nut 31 mentioned above, is screwed onto the bolt 68. When the nut 69 is loosened, the gate 58 may be slid circumferentially about the cylindrical section 41 of the hopper bottom 3 so as to dispose the end 59 across the opening 44 to the extent desired, and as indicated by the pointer 62 with reference to the indicia 63, and when the desired position is attained, tightening the wing nut 69 secures the gate in position. The end 59 of the gate is held against the outward displacement by an upper lug 71 which overhangs the end 59, as best shown in Figure 3. The lug 71 also serves as a guide when adjusting the gate 58. The flow-controlling gate at the opposite side of the hopper and which controls the flow of fertilizing material through the other opening 45 is substantially identical with the gate just described, hence the same reference numerals have been used and further detailed description is believed to be unnecessary. It is to be noted, however, that the provision of flow-controlling gates which are arcuate but generally less than semi-circular makes it easily feasible to provide two of such controlling means whereby the provision of a hopper for a base having two discharge spouts, generally diametrically opposed, is readily accommodated without having either flow-controlling means interfere with the other. Also, the provision of a combined finger hold and indicia for each flow-controlling gate facilitates the adjustment of the gates to substantially identical positions whereby substantially exactly the same amount of material is distributed through each of the two discharge outlets.

The lower edge 75 (Figure 1) of the hopper bottom 3 is closed by means of a fertilizer feed plate 80. This member is somewhat similar to the corresponding member disclosed in U. S. Patent 2,369,508, issued February 13, 1945, to Charles H. White, and comprises a bottom section 81 and a central generally upwardly tapered dome-like section 82, the upper end of which is provided with a socket 83 and the interior portion of which is provided with a socket 84. The latter section is generally square in cross section and receives a similarly formed heavy nut 85 which is threaded onto the upper end of a bolt 86 which forms a driving member. Preferably, the bolt 86 extends upwardly through a bushing 87 that is disposed within a tubular bearing portion 88 carried by the base 4. The bushing 87 is of such length that when the nut 85 is tightened, the same bears firmly and rigidly through an intermediate hardened steel washer 89 against the upper end of the bushing 87, whereby the driving member 86 is disposed for free rotation in the base 4 and, being driven in the direction which causes the nut 85 to tend to tighten, the nut 85 serves to connect the hopper bottom feed plate 80 with the driving member 86 so as to be driven thereby.

The hopper bottom feed plate 80 is held resiliently up against the lower edge 75 of the hopper bottom 3 by spring means which will now be described. Such means comprises a rod 92, the lower end of which is formed as an eye 93 and is received in the socket 83 of the plate 80. The latter is provided with a lug 94 adjacent the socket 83, and the lug as well as the socket is apertured to receive a connecting pin 95 which, extending through the socket 83 and the eye 93 of the rod 92, serves to connect the latter member to the feed plate 80 for rotation therewith. The pin 95 is held in place by a cotter 96 or other suitable means.

The upper end of the rod 92 is threaded, as indicated at 101, and extends upwardly through an opening 102 in a cross member or bracket 103 which is rigidly connected to and forms a part of the fertilizer can 2. Preferably, the member 103 is in the form of a channel and the end portions are bent downwardly to facilitate the connection, as by welding, of the member 103 to the can 2. Embracing the cross bar or bracket 103 is a yoke 106 the intermediate portion of which is apertured to receive the upper end of the rod 92, the yoke having side sections 107 and 108 which embrace the bracket 103. A hardened steel washer 111 is disposed about the upper end of the rod 92 and serves as anti-friction means between the yoke 106 and a wing nut 112 which is screwed onto the upper ends of the rod 92 until it bottoms against the upper end of the rod. The parts are so arranged that when the rod 92 rotates with the plate 80, the yoke 106 being held against rotation by virtue of its embracing relation with the bracket 103, the direction of rotation is such that the upper nut member 112 tends to be tightened onto the rod 92. A spring 115 is disposed between the yoke 106 and the cross bracket 103 and is of sufficient strength to resiliently hold the plate 80 up against the edge 75 of the hopper bottom both when the hopper is full of fertilizer as well as when it is substantially empty. Since the feed plate 80 is held in this manner against the hopper bottom 3, it will readily be seen that when the hopper 1 is detached from the base 4, the feed plate 80 is removed with the hopper 1 and there is no danger of spilling fertilizer from the hopper, yet the latter may be easily and quickly emptied, as at the end of the day, by turning the hopper upside down. It will be noted from Figure 3 that the lower edge 58a of each of the gates 58 is in substantially the same horizontal plane as the lower edge 75 of the hopper bottom so that the spring 115 in holding the feed plate 80 up against the lower hopper bottom edge 75 also holds the plate 80 up against the lower edge of the flow-controlling gates 51 in any position of adjustment.

A spring wire agitator 120 is disposed in the can 2 and is provided with an outer upturned end section 121 which serves to agitate the material in the can 2 and an inner spring coil section 122 which is disposed about the central upwardly extending portion 82 of the feed plate 80. The lug 94, mentioned above, is disposed close to the socket section 83 so as to provide a slot 124 therebetween. As best shown in Figure 2, the slot 124 receives the end portions 125 and 126 of the spring wire agitator so as to cause the latter member to rotate with the feed plate 80. Also, the parts are so constructed and arranged that when the spring wire agitator 120 is in position on the feed plate 80 the same lies below the pin 95 and is held by the latter member in operative position connected nonrotatably with the feed plate 80. The end portions 125 and 126, being the portions that extend tangentially from the coil portion 122 of the agitator 120, bear principally against the lug 94 and causing the agitator 120 to rotate with the feed plate 80.

While I have shown and described above the preferred form of the present invention, it is to be understood that the latter is not to be limited to the particular details shown and described above, but that, in fact, widely different means may be employed in the practice of the broader aspects of my invention.

What I claim, therefore, and desire to secure by Letters Patent is:

1. A hopper construction comprising a container having an open bottom, a feed plate normally disposed below and closing said open bottom of said container and mounted for continuous rotation with respect thereto in one direction, a support carried by said container above said feed plate in stationary relation with respect to said container, and means connected with said support for continuous rotation relative thereto in said one direction and acting between said feed plate and said support for holding said feed plate against the lower part of said container.

2. A hopper construction comprising a base having a continuously rotatable driving element, a hopper detachably mounted on said base and including an open lower end, a feed plate disposed below and normally closing said lower open end including a central section detachably receiving said driving element whereby the feed plate is rotatable continuously in one direction by said driving element, a bracket carried by the upper portion of said hopper, and means including relatively rotatable parts acting between said bracket and said central section of the feed plate for holding the feed plate up against the lower end of said hopper when the latter is detached from said base and the feed plate separated from said driving element, said relatively rotatable parts being constructed and arranged to accommodate continuous rotation of said feed plate in one direction when said hopper is mounted on said base.

3. In a fertilizer distributor, a hopper, a rotatable feed plate at the lower end of said hopper, an agitator carried by said feed plate in driving engagement therewith, a member connected with said plate for holding the agitator in driving engagement with said plate, and a connection between said member and said hopper for retaining the plate against the lower end of said hopper.

4. In a fertilizer distributor having a detachably mounted generally vertically disposed hopper and a rotatable feed plate closing the lower end of said hopper, means for holding said plate against the lower end of said hopper comprising a bracket across the upper portion of said hopper, a yoke embracing said bracket so as to be slidable but non-rotatable relative to said bracket, said bracket and yoke having aligned openings, a rod connectible at its lower end with said feed plate and extending through said aligned apertures, a yoke-engaging part on the upper end of said rod, and a spring encircling the upper end of said rod and disposed between the upper side of said bracket and said yoke so as to exert a force tending to lift said rod.

5. In a fertilizer distributor having a detachably mounted generally vertically disposed hopper, a rotatable feed plate closing the lower end of said hopper, and a hold-up rod rotatably connected with said hopper, the combination therewith of an eye on the lower end of said rod, an upwardly facing socket on the central part of said plate adapted to receive said eye, and a pin extending transversely through said socket and said eye for connecting the latter to said feed plate.

6. In a fertilizer distributor, a feed plate having an upstanding central portion, an upwardly facing socket formed on said portion, means on said plate adjacent said socket forming a slot, a hold-up rod having an eye seating in said socket, an agitator disposed about said central portion and having an end seated in said slot, and a transverse pin disposed in apertures in said central portion, said pin overlying said agitator and agitator end for holding said agitator in place on said plate and extending through the eye of said rod for holding the latter connected with said feed plate.

7. In a fertilizer distributor, a hopper bottom having a generally cylindrical ring-like section, the walls of which are interrupted at least at one point to form a discharge opening extending circumferentially of the hopper bottom, a fertilizer guiding wall section extending diagonally inwardly from one end of said opening, and an upper shield section extending generally horizontally inwardly from the upper edge of said opening and joining said diagonally inwardly extending wall along its upper edge.

8. In a fertilizer distributor, a hopper bottom having a generally cylindrical ring-like section, the walls of which are interrupted at least at one point to form a discharge opening extending circumferentially of the hopper bottom, a fertilizer guiding wall section extending diagonally inwardly from one end of said opening, an upper shield section extending generally horizontally inwardly from the upper edge of said opening and joining said diagonally inwardly extending wall along its upper edge, and an arcuate gate shiftably mounted on said ring-like section and disposed so that one end of said gate extends substantially underneath said shield section from said other end of said discharge opening and is movable arcuately across said opening toward said one end thereof and said diagonally inwardly extending wall section for controllably adjusting the effective size of said discharge opening.

9. In a fertilizer distributor having a detachably mounted, generally vertically disposed hopper and a rotatable feed plate closing the lower end of said hopper, means for holding said plate against the lower end of said hopper comprising a bracket across the upper portion of said hopper, means for fixedly connecting said bracket to the hopper, said bracket being apertured, a rod connectible at its lower end with said feed plate and extending upwardly through the aperture in said bracket, a spring encircling the upper end of said rod and disposed against the upper side of said bracket, and means reacting against the upper end of said rod above said bracket and hold against rotation relative to said bracket for receiving the upper end of said spring.

10. In a fertilizer distributor having a detachably mounted, generally vertically disposed hopper and a rotatable feed plate closing the lower end of said hopper, means for holding said plate against the lower end of said hopper comprising a bracket across the upper portion of said hopper, means for fixedly connecting said bracket to the hopper, said bracket being apertured, a rod connectible at its lower end with said feed plate and extending upwardly through the aperture in said bracket, a spring encircling the upper end of said rod and disposed against the upper side of said bracket, a part fixed to the upper end of said rod for receiving the upward thrust of said spring, and means held against rotation relative to said bracket and interposed between the upper end of said spring and said part for protecting said spring against rotation of said rod when said feed plate is rotated.

11. In a hopper construction which includes a base having a driving element, a hopper detachably mounted on said base and including an open lower end, a feed plate normally closing said lower open end including a central section detachably receiving said driving element, and means for rotating said feed plate continuously in one direction: the improvement which includes means for holding said plate against the lower end of said hopper when the hopper is detached from said base, comprising an elongated member adapted to be disposed generally axially within said hopper, means for connecting the lower end of said member to the feed plate so as to rotate continuously in said one direction with said plate, a part on the upper end of said member and rotatable therewith when said feed plate and member are driven, and means adapted to be fixedly connected to said hopper so as to be stationary relative thereto and including a resilient section and an apertured portion receiving the upper end of said elongated member, so as to accommodate said continuous rotation thereof, and acting upwardly against said part for urging said elongated member and said feed plate upwardly relative to said hopper.

WILLIAM P. OEHLER.

References Cited in the file of this patent

UNITED STATES PATENTS

| Number | Name | Date |
|---|---|---|
| 176,405 | Mead | Apr. 18, 1876 |
| 313,320 | Goodale | Mar. 3, 1885 |
| 480,146 | Souder | Aug. 2, 1892 |
| 888,963 | Dahland | May 26, 1908 |
| 1,010,257 | Heflin | Nov. 28, 1911 |
| 1,237,629 | Ford | Aug. 21, 1917 |
| 1,448,423 | Tillotson | Mar. 13, 1923 |
| 1,651,605 | Kuhn et al. | Dec. 6, 1927 |
| 1,868,298 | Wallo | July 19, 1932 |
| 2,369,508 | White | Feb. 13, 1945 |
| 2,435,039 | Harper | Jan. 27, 1948 |